3,443,968
FLAN-TYPE MILK PUDDING AND METHOD AND GELLING AGENT FOR MAKING SAME
Arthur L. Moirano, Mountainside, N.J., assignor to Marine Colloids, Inc., Springfield, N.J., a corporation of Delaware
No Drawing. Filed Jan. 12, 1966, Ser. No. 520,068
Int. Cl. A23l 1/34, 1/04
U.S. Cl. 99—139     3 Claims

ABSTRACT OF THE DISCLOSURE

A flan-type milk pudding with minimal or no syneresis produced by adding to heated milk carrageenan having a high water gel strength and a phosphate selected from the group consisting of sodium hexametaphosphate tetrasodium pyraphosphate, sodium tripolyphosphate and trisodium phosphate in an amount sufficient to decrease the influence of the calcium content of the milk on the carrageenan.

---

This invention relates to milk puddings of the flan-type and to an improved method and gelling agent for making such puddings.

A true flan normally is made with eggs and has the characteristic texture and mouth feel imparted by eggs. This texture and mouth feel are characteristic of custard and similar flan puddings and they are desirable in a flan-type pudding. However, the expense and unavailability of eggs as a setting agent has prompted the preparation of flan mixes using some stabilizing agent other than eggs. It is a requisite that any substitute stabilizing agent should approximate as closely as possible the characteristic egg texture and mouth feel and that the flan have the capability of setting at room temperature since refrigeration in many cases is not available. It is also a requisite that the stabilizing agent perform uniformly when used with the various types of milk that are present in various parts of the world. It also is important that the finished pudding exhibit minimal syneresis.

Heretofore flan-type milk puddings have been prepared using furcellaran extract and also using carageenan as the stabilizing agent. Furcellaran extract also is commonly referred to as Danish agar. As prepared heretofore, flan-type milk puddings prepared using furcellaran extract have properties which are much superior to those prepared from carrageenan as regards the desired texture and mouth feel of a true flan. Carrageenan often results in the flan-type pudding becoming discontinuous and curdy in texture and lacking the desirable consistency and mouth feel that can be obtained when using furcellaran extract. Moreover, carrageenan is much more sensitive as compared with furcellaran extract to differences in different types of milk as regards the degree and nature of the gelation produced in the finished pudding, and it is for this reason that attempts to use carrageenan as the stabilizing agent for flan-type milk puddings has resulted in lack of uniformity depending on the milk source employed. This, as aforesaid, is a serious disadvantage in the marketing of an acceptable commercial product. A further disadvantage in the use of carrageenan as compared with furcellaran extract is that while there is some syneresis exhibited when furcellaran extract is employed as the stabilizing agent for a flan-type milk pudding, there is substantially greater syneresis in the resulting pudding when carrageenan, as used heretofore, is employed as the stabilizing agent.

On the other hand, carrageenan for a given amount possesses greater gel-forming properties than furcellaran extract and because a given degree of gel can be accomplished using a lesser quantity of carrageenan it would be of substantial economic advantage to use carrageenan rather than furcellaran extract as the stabilizing agent for a flan-type milk pudding.

It is an object of this invention to improve the gelling characteristics of carrageenan when employed as a stabilizing agent with milk.

It is a more particular object of this invention to improve the gelling characteristics of carrageenan when employed in a flan-type milk pudding so as to provide more desirable texture and mouth feel.

A further object of this invention is to improve upon the employment of carrageenan as a stabilizing agent for milk and more particularly for a flan-type milk pudding as regards making the carrageenan less susceptible to variations in gelling characteristics when milks from different sources are employed.

A still further object of this invention is to provide a flan-type milk pudding using carrageenan as a stabilizing agent which exhibits much less syneresis than one made with furcellaran alone.

According to this invention, the aforesaid objects are obtained by employed with carrageenan a phosphate selected from the group consisting of sodium hexametaphosphate, tetrasodium pyrophosphate, sodium tripolyphosphate and trisodium phosphate. Other phosphates have been experimented with but have not been found to be suitable. The phosphate preferably is employed in an amount which is approximately that of the carrageenan which is used as the stabilizing agent. More generally, in preferred practice the ratio of carrageenan to phosphate may be varied from about 3:1 to 1:3. However, to the extent that the phosphate is present in an amount effective to improve the gelling characteristics of the carrageenan, then, and to a corresponding extent, the advantages of this invention are utilized.

Carrageenan is a well-recognized extractive obtained from the following members of the families Gigartinaceae and Solieriaceae of the class Rodophyceae (red seaweed): *Chondrus crispus, Chondrus ocellatus, Eucheuma cottonii, Eucheuma spinosum, Gigartina acicularis, Gigartina pistillata, Gigartina radula,* and *Gigartina stellata* (Fed. Register, Oct. 6, 1961, p. 9411). While carrageenan may be used in the practice of the invention when extracted by conventional extracting techniques, it is preferable to employ carrageenan whose gel-forming properties have been enhanced by alkaline hydrolysis as disclosed in U.S. Patent No. 3,094,517. While both milk reactivity and water gel strength may be enhanced as disclosed in said patent, the property of the greater significance in the production of flan-type milk puddings in the practice of the present invention is that of enhanced water gel strength, as this term is defined in said patent, namely, the strength of a gel containing 1.5% of carrageenan extract in water at 10° C. expressed in grams as measured by a Bloom gelometer equipped with a 0.5-inch diameter plunger and when employing the techniques described in said patent in connection with the measurement of both milk reactivity and water gel strength. When water gel strength of carrageenan is referred to elsewhere herein and in the claims, the strength value is that measured in this manner. It is preferable in the practice of this invention that a carrageenan be employed which has an water gel strength of at least 50 grams.

In the practice of this invention the phosphate as above defined should be present when the carrageenan exercises its gelling effect on milk in which it is dissolved. In a typical conventional formulation for a flan-type pudding the phosphate and the carrageenan ordinarily are intermingled in the dry particulate state for addition to milk in an amount appropriate for providing the desired gel consistency. In the usual pudding formulation the carrageenan and phosphate are combined with other materials. Thus the pudding formulation may comprise sugar or some other sweetening agent, color, a flavoring agent and a small amount of salt. Fortifying substances such as vitamins also may be present. Of course, if desired the usual ingredients of a pudding may be omitted. For example, an elemental dietary flan-type pudding can be prepared simply by dissolving the carrageenan and the phosphate in milk in an appropriate amount to give the desired gel consistency. However, for a commercial product at least some coloring agent and a flavoring agent are present in order to make the pudding more attractive and palatable.

In the preparation of a flan-type milk pudding having desirable gelled consistency the amount of carrageenan per pint of milk ordinarily is from about 0.5 to 1.5 grams. This amount of carrageenan is especially appropriate when the carrageenan employed has an water gel strength of at least 50 grams, and in normal practice this type of carrageenan is employed. If carrageenan is employed having less water gel strength, a somewhat greater amount of carrageenan may be employed in order to provide the desired gel strength, but this involves additional expense and it is preferred in the practice of this invention to employ the carrageenan having enhanced gelling strength characteristics resulting from alkaline hydrolysis as disclosed in said Patent No. 3,094,517.

The above-described phosphate is employed at the rate of about 0.5 to about 1.5 grams per pint of milk. The optimum quantities for each of the aforesaid phosphates are approximately 1.0 gram of sodium hexametaphosphate, 0.8 gram of tetrasodium pyrophosphate, 0.9 gram of sodium tripolyphosphate and 0.6 gram of trisodium phosphate.

In the preparation of a flan-type milk pudding the carrageenan and the phosphate are added to the milk and, to assist in their dispersion, the carrageenan and the phosphate are mixed with at least a portion of the milk that is heated approximately to boiling. It is advantageous in the practice of this invention to heat only about half of the milk required for the flan-type pudding and dissolve the carrageenan and phosphate therein. After dissolution has been accomplished the rest of the milk, unheated, may be added. This sequence is a desirable feature of the practice of this invention since the heating of the milk is expedited and since the cooling of the complete mix to room temperature also is expedited. When furcellaran extract is employed this technique in pudding preparation cannot be employed since, in the case of furcellaran extract, the addition of the second portion of unheated milk induces premature gelation.

Another advantage in the use of carrageenan commingled with the phosphate in accordance with this invention is that the desired gel stiffness in the flan pudding can be accomplished when using an amount of carrageenan which is only about half that which is required to produce corresponding gelation when using furcellaran extract. At the same time, by reason of the presence of the phosphate the texture and mouth feel of the resulting flan pudding are fully comparable to those possessed by a flan-type milk pudding using furcellaran extract as the stabilizing agent. Moreover, when the carrageenan in combination with the phosphate is employed the syneresis exhibited by the resulting milk pudding, instead of being substantially greater than when furcellaran is used, becomes substantially less than when furcellaran extract is used. It is also the case that these desirable properties are obtained consistently without regard to variations in the source of the milk employed.

The differences in gelling behavior as between carrageenan and furcellaran extract are believed to be due to differences in the effect on gelation of the proteins contained in milk, the furcellaran extract being less influenced by milk proteins as compared with carrageenan. However, when the particular phosphates hereinabove defined are present they appear to modify the gelling characteristics of the carrageenan so as to be more similar to those exhibited by furcellaran as regards the influence thereon of milk proteins.

The following are typical examples of compositions in the dry state in quantities appropriate for the production of a desirable flan-type pudding when used with 1 pint of milk:

| Formula | 1 (g.) | 2 (g.) | 3 (g.) | 4 (g.) | 5 (g.) |
| --- | --- | --- | --- | --- | --- |
| Sugar color flavor salt | 57.9 | 57.9 | 58.4 | 58.3 | 58.9 |
| Furcellaran extract | 2.1 | | | | |
| Carrageenan [1] | | 1.1 | 0.8 | 1.1 | 1.1 |
| Sodium hexametaphosphate | | 1.0 | | | |
| Tetrasodium pyrophosphate | | | 0.8 | 0.6 | |
| Total | 60.0 | 60.0 | 60.0 | 60.0 | 60.0 |

[1] Water gel strength about 50 grams.

The extent of gelation was approximately the same for each of the foregoing formulas when made up with the milk to provide a flan-type pudding. It is to be noted that the desired extent of gelation is accomplished when the amount of carrageenan is only about half that required in the case of furcellaran extract. In the case of Formulas 2, 3 and 4, which employ the carrageenan in combination with phosphate in accordance with this invention, the texture and mouth feel of the resulting flan-type pudding were fully comparable to those obtained when using furcellaran extract. Moreover, the flan-type pudding using the carrageenan in combination with the phosphate resulted in approximately 30% less syneresis than in the case of the flan based on the furcellaran extract. In the case of Formula 5 in which carrageenan was employed but without the improving effect of the phosphate, the resulting flan-type milk pudding did not have a continuous gel structure and possessed a curdy appearance and undesirable mouth feel. Moreover, the resulting pudding exhibited more syneresis than was the case when using furcellaran extract. It is these undesirable properties as compared with those obtained when using furcellaran extract that have accounted for preferential demand for furcellaran based flan-type milk puddings. According to the present invention, carrageenan may now be used in the preparation of flan-type milk puddings at a substantial saving as regards cost and with the attainment of comparable texture and mouth feel combined with greater ease of preparation and reduced syneresis.

I claim:

1. A flan-type milk pudding which comprises milk and which comprises per pint of milk from about 0.5 to about 1.5 grams of carrageenan having a water gel strength of at least about 50 grams and from about 0.5 to about 1.5 grams of a phosphate selected from the group consisting of sodium hexametaphosphate, tetrasodium pyrophosphate, sodium tripolyphosphate and trisodium phosphate, said pudding being the product of dissolving said carrageenan in said milk at an elevated temperature at which said carrageenan is soluble in said milk, including said phosphate in said solution and cooling said solution to effect gelation induced by said carrageenan in the presence of said phosphate and essentially in the absence of any extraneous compound of calcium or other metal that is reactive with said phosphate to form an insoluble precipitate.

2. A flan-type pudding according to claim 1 which also comprises a sweetening agent and a flavoring agent.

3. A composition adapted when incorporated with milk to induce gelation to produce a flan-type pudding said composition comprising carrageenan having a water gel strength of at least about 50 grams and a phosphate selected from the group consisting of sodium hexametaphosphate, tetrasodium pyrophosphate, sodium tripolyphosphate and trisodium phosphate, the ratio by weight of said carrageenan to said phosphate being from about 3:1 to about 1:3 and said composition being substantially free of any extraneous water soluble compound of calcium or other metal which forms a water insoluble precipitate with said phosphate.

References Cited

UNITED STATES PATENTS

| 2,801,923 | 8/1957 | Stoloff | 99—139 |
| 2,829,978 | 4/1958 | Castagna et al. | 99—139 |
| 2,949,366 | 8/1960 | Hunter et al. | 99—139 |

A. LOUIS MONACELL, *Primary Examiner.*

J. M. HUNTER, *Assistant Examiner.*

U.S. Cl. X.R.

99—131